United States Patent
Koch et al.

(10) Patent No.: US 11,874,148 B2
(45) Date of Patent: Jan. 16, 2024

(54) METHODS AND SYSTEMS FOR MEASURING ORGANIC MATERIAL THROUGHPUT DATA OF HARVESTED CROPS

(71) Applicant: AGCO Corporation, Duluth, GA (US)

(72) Inventors: Jared Koch, Hesston, KS (US); Joshua Ekholm, Hesston, KS (US); Jacob Finger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 403 days.

(21) Appl. No.: 17/138,514

(22) Filed: Dec. 30, 2020

(65) Prior Publication Data
US 2021/0195839 A1    Jul. 1, 2021

Related U.S. Application Data (60) Provisional application No. 62/954,740, filed on Dec. 30, 2019.

(51) Int. Cl.
*G01F 1/00* (2022.01)
*A01C 21/00* (2006.01)
(Continued)

(52) U.S. Cl.
CPC .............. *G01F 1/00* (2013.01); *A01C 21/007* (2013.01); *A01D 41/1277* (2013.01);
(Continued)

(58) Field of Classification Search
CPC ......... A01C 21/007; G01F 1/00; G01G 11/00; G01G 11/083; G01V 99/00; A01B 39/18;
(Continued)

(56) References Cited

U.S. PATENT DOCUMENTS 6,073,427 A * 6/2000 Nichols .............. A01D 41/1271
460/7
6,185,990 B1 * 2/2001 Missotten ............ A01B 79/005
56/10.2 A
(Continued)

FOREIGN PATENT DOCUMENTS

DE    102018111077 A1 * 11/2019 ........... A01D 41/127
EP    960558 A1 * 12/1999 ........... A01B 79/005
(Continued)

OTHER PUBLICATIONS

UK Intellectual Property Office, Search Report for related UK Application No. GB2000216.8, dated Jul. 9, 2020.

*Primary Examiner* — Arpad F Kovacs (57) ABSTRACT

Methods and systems for monitoring a throughput of a crop cut from a field. The system may include, and the method may be performed at least in part using, a combine harvester including a feeder box, a main body, a threshing mechanism, and an organic material throughput sensor provided within the feeder box. The system may also include a data management system. The organic material throughput sensor senses organic material throughput data including at least one of a volume of the organic material, and a weight of the organic material, and the data management system outputs an organic material throughput map or other information based on the organic material throughput data. Using the organic material throughput data or the organic material throughput map, a producer or other operator can make a more informed planting or treatment decision for a field.

7 Claims, 7 Drawing Sheets

(51) Int. Cl.
*A01D 41/127* (2006.01)
*A01F 12/10* (2006.01)
*A01F 12/18* (2006.01)
*G01G 11/00* (2006.01)
*A01B 69/00* (2006.01)
*A01B 39/20* (2006.01)
*G01G 11/08* (2006.01)
*A01B 39/18* (2006.01)
*G01V 99/00* (2009.01)

(52) U.S. Cl.
CPC .............. *A01F 12/10* (2013.01); *A01F 12/18* (2013.01); *G01G 11/00* (2013.01); *A01B 39/18* (2013.01); *A01B 39/20* (2013.01); *A01B 69/001* (2013.01); *G01G 11/083* (2013.01); *G01V 99/00* (2013.01)

(58) Field of Classification Search
CPC ..... A01B 39/20; A01B 69/001; A01B 79/005; A01D 41/1271; A01D 41/1272; A01D 41/1277; A01F 12/10; A01F 12/18
See application file for complete search history.

(56) References Cited

U.S. PATENT DOCUMENTS

| | | | |
|---|---|---|---|
| 9,468,140 B2* | 10/2016 | Madsen | A01B 69/001 |
| 10,820,504 B2* | 11/2020 | Borsdorf | A01D 41/1271 |
| 11,212,962 B2* | 1/2022 | Hendrickson | A01D 45/021 |
| 11,304,369 B2* | 4/2022 | Bormann | A01D 41/141 |
| 11,317,562 B2* | 5/2022 | Duke | A01D 41/1272 |
| 11,432,464 B2* | 9/2022 | Hayashi | A01D 57/20 |
| 2014/0236381 A1* | 8/2014 | Anderson | A01B 79/005 |
| | | | 701/1 |
| 2015/0293068 A1* | 10/2015 | Acheson | G01N 21/84 |
| | | | 702/170 |
| 2015/0327440 A1* | 11/2015 | Dybro | A01D 75/00 |
| | | | 73/862.541 |
| 2016/0029558 A1* | 2/2016 | Dybro | A01D 41/127 |
| | | | 701/50 |
| 2016/0084987 A1* | 3/2016 | Dybro | G01B 21/22 |
| | | | 702/5 |
| 2017/0089742 A1* | 3/2017 | Bruns | A01D 41/1273 |
| 2017/0112061 A1* | 4/2017 | Meyer | G06F 3/0482 |
| 2019/0246561 A1* | 8/2019 | Neitemeier | A01D 41/127 |

FOREIGN PATENT DOCUMENTS

| | | | | |
|---|---|---|---|---|
| EP | 0960558 A1 | | 12/1999 | |
| EP | 2687923 A2 * | | 1/2014 | .......... A01D 41/127 |
| EP | 3000304 A1 * | | 3/2016 | .......... A01B 79/005 |
| EP | 3000305 A1 * | | 3/2016 | .......... A01D 41/127 |
| EP | 3008990 A2 | | 4/2016 | |
| EP | 3566565 A1 | | 11/2019 | |
| EP | 3590320 A1 * | | 1/2020 | ......... A01D 41/1243 |
| EP | 3772269 A1 * | | 2/2021 | ......... A01D 41/1271 |
| EP | 2915422 B2 * | | 11/2022 | .......... A01D 41/127 |
| WO | WO-0241687 A2 * | | 5/2002 | .......... A01B 79/005 |

* cited by examiner

METHODS AND SYSTEMS FOR MEASURING ORGANIC MATERIAL THROUGHPUT DATA OF HARVESTED CROPS

CROSS REFERENCE TO RELATED APPLICATION

This application claims the benefit of U.S. Provisional Application No. 62/954,740, filed Dec. 30, 2019, which is hereby incorporated by reference in its entirety.

BACKGROUND

Producers planting, growing, and harvesting crops track certain data and metrics to inform future planting and treatment decisions such as how much seed to apply in a subsequent harvest, which crop or crop varietal to plant, and what type and how much soil conditioner or fertilizer to use, among other planting and treatment decisions. One common type of data used for this purpose is crop yield data. In this regard, agricultural implements and machinery include yield monitoring systems that measure the weight or volume of the crop yield as the crop is being harvested, which can later be reviewed by the producer as indicative of the health of the crop and the efficiency of planting and fertilizer techniques, which in turn aids in making a planting or treatment decision for subsequent harvests.

Often, however, a producer is unable to determine the true health of a field or crop or else make accurate prescription planting and fertilizer decisions based on yield data alone. For example, sometimes crop yield and total crop volume will not directly correlate. Thus, a rather healthy-looking crop may result in a relatively low yield, or conversely a rather unhealthy-looking crop may in fact result in a relatively high yield. Relying solely on yield data can result in less-than-optimal planting or treatment decisions.

There thus remains a need to provide a producer with more complete crop metrics or data in order for the producer to make more informed planting, treatment, and other crop-related decisions.

SUMMARY

The present invention is directed to methods and systems for collecting organic material throughput data and using the organic material throughput data instead of or in addition to other crop data and metrics, such a crop yield data, when making a planting or treatment decision. More particularly, the invention is directed to measuring the total relative harvested crop volume and, in some embodiments, making subsequent planting or treatment decisions based on the total relative harvested crop volume.

For example, some embodiments of the invention are directed to a method of monitoring a throughput of a crop. The method may include cutting organic material using a combine harvester and conveying the organic material through the combine harvester to a threshing mechanism located within the combine harvester. Prior to the organic material being conveyed through the threshing mechanism, an organic material throughput sensor senses organic material throughput data, which may be at least one of a volume of the organic material and a weight of the organic material. The organic material throughput data is transmitted to a data management system, which outputs an organic material throughput map based on the organic material throughput data.

Other embodiments of the invention are directed to a method of monitoring a throughput of a crop. The method includes cutting a first set of organic material using a combine harvester, conveying the first set of organic material through the combine harvester to a threshing mechanism located within the combine harvester, and, prior to the first set of organic material being conveyed through the threshing mechanism, sensing, using an organic material throughput sensor, a first organic material throughput data including at least one of a volume of the first set of organic material and a weight of the first set of organic material. The method further includes cutting a second set of organic material using the combine harvester, conveying the second set of organic material through the combine harvester to the threshing mechanism, and, prior to the second set of organic material being conveyed through the threshing mechanism, sensing, using the organic material throughput sensor, second organic material throughput data including at least one of a volume of the second set of organic material and a weight of the second set of organic material. In some embodiments, the method may include determining, based on a comparison of the first organic material throughput data and the second organic material throughput data, at least one of a type of crop to plant in a field, an amount of seed to plant in the field, a type of fertilizer to apply to the field, and an amount of fertilizer to apply to the field.

Still other embodiments of the invention are directed to a system for monitoring a throughput of a crop. The system may include a combine harvester including a feeder box, a main body downstream of the feeder box, a threshing mechanism within the main body, and an organic material throughput sensor provided within the feeder box. The system may also include a data management system remote from the combine harvester. The organic material throughput sensor senses organic material throughput data including at least one of a volume of the organic material, and a weight of the organic material and the data management system outputs an organic material throughput map based on the organic material throughput data.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION

Generally, aspects of the invention are directed to a methods and systems for collecting organic material throughput data and using the same instead of, or else in addition to, other data such as crop yield data when making a planting or treatment decision. More particularly, the invention is directed to measuring the total relative harvested crop volume, which correlates to the overall spread organic matter in the field, and making a planting or treatment decision in light of the same.

In some embodiments, a producer, grower, or other user can use the organic material throughput data to, for example, build maps relating organic soil health directly to harvested organic volume and thus a prescription map can be compiled for adding organic material to the areas lacking. Moreover, crop yield and crop volume do not always correlate. The mapped organic material throughput data thus provides a producer the ability to determine crop varieties efficiencies based on yield, fertilizer consumption, and total plant mass. Still more, crop residue is often removed from the field by several different methods including bailing, burning, and grazing, among others. This removed material results in the reduction of the number of micro- and macro-nutrients in the soil. Using the organic material throughput data, the producer can replace these nutrients as required without the using a soil map. And using the organic material throughput data gives the producer the ability to map organic matter over time, which can be applied to future soil health goals. These and other aspects of the invention will become more apparent via the detailed description of the invention in connection with the accompanying figures.

Figure 1:
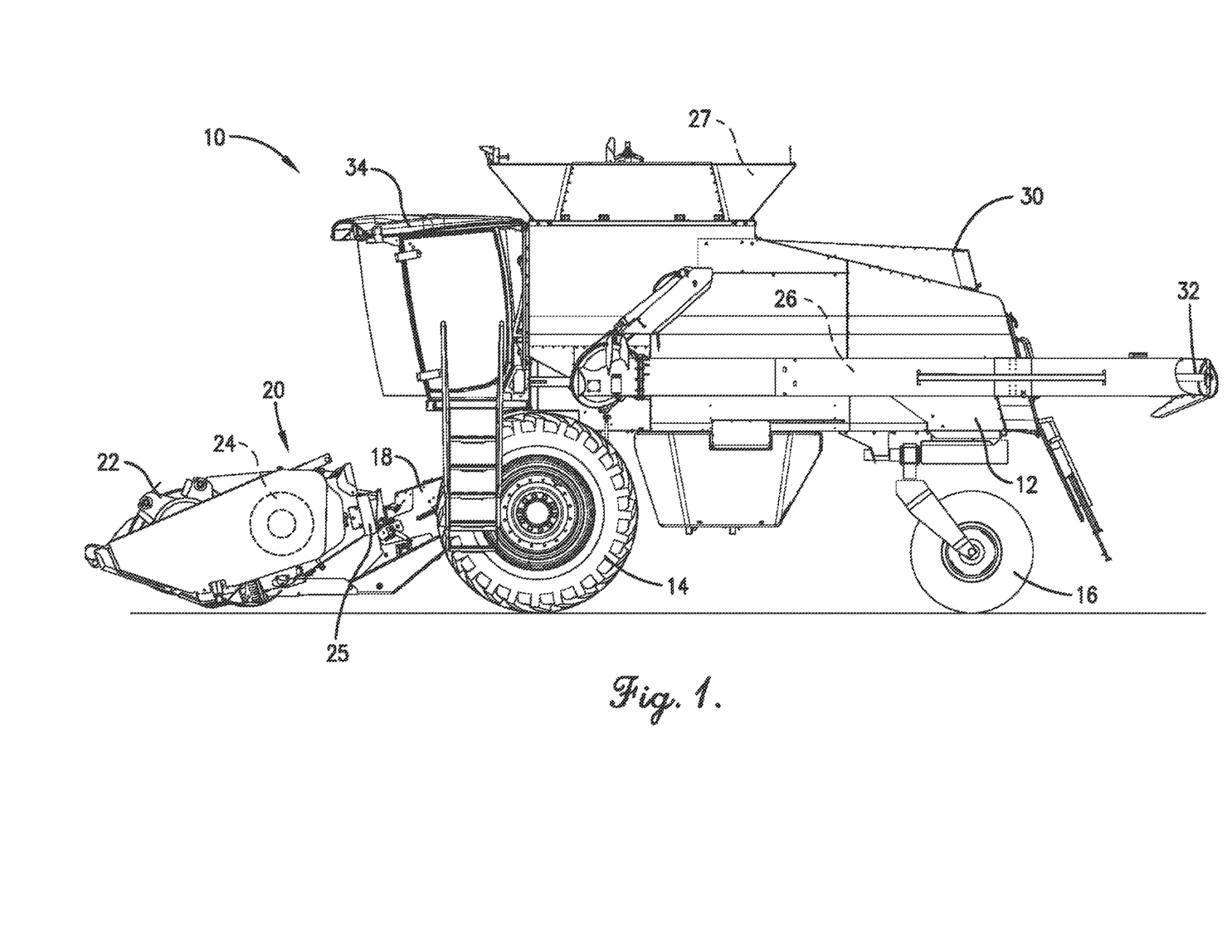
FIG. 1 is an elevation view of a combine harvester as one example of machinery used to collect organic material throughput data according to aspects of the invention.

FIG. 1 shows a combine harvester 10 that may employ various aspects of the invention. The combine harvester 10 generally includes a main body 12 housing various crop threshing, cleaning, transporting, and storage equipment as will be discussed in more detail below. The main body 12 supports front drive wheels or tracks 14, rear steering wheels 16, and an operator's cab 34 at a front portion of the combine harvester 10. Extending from a front of the main body 12 is a feeder house 18 operatively coupled to a crop gathering header 20. As will be discussed in more detail, the feeder house 18 feeds cut organic material into an interior of the main body 12 during operation of the combine harvester 10, while the crop gathering header 20 gathers, cuts, and conveys the organic material to the feeder house 18.

Figure 2:
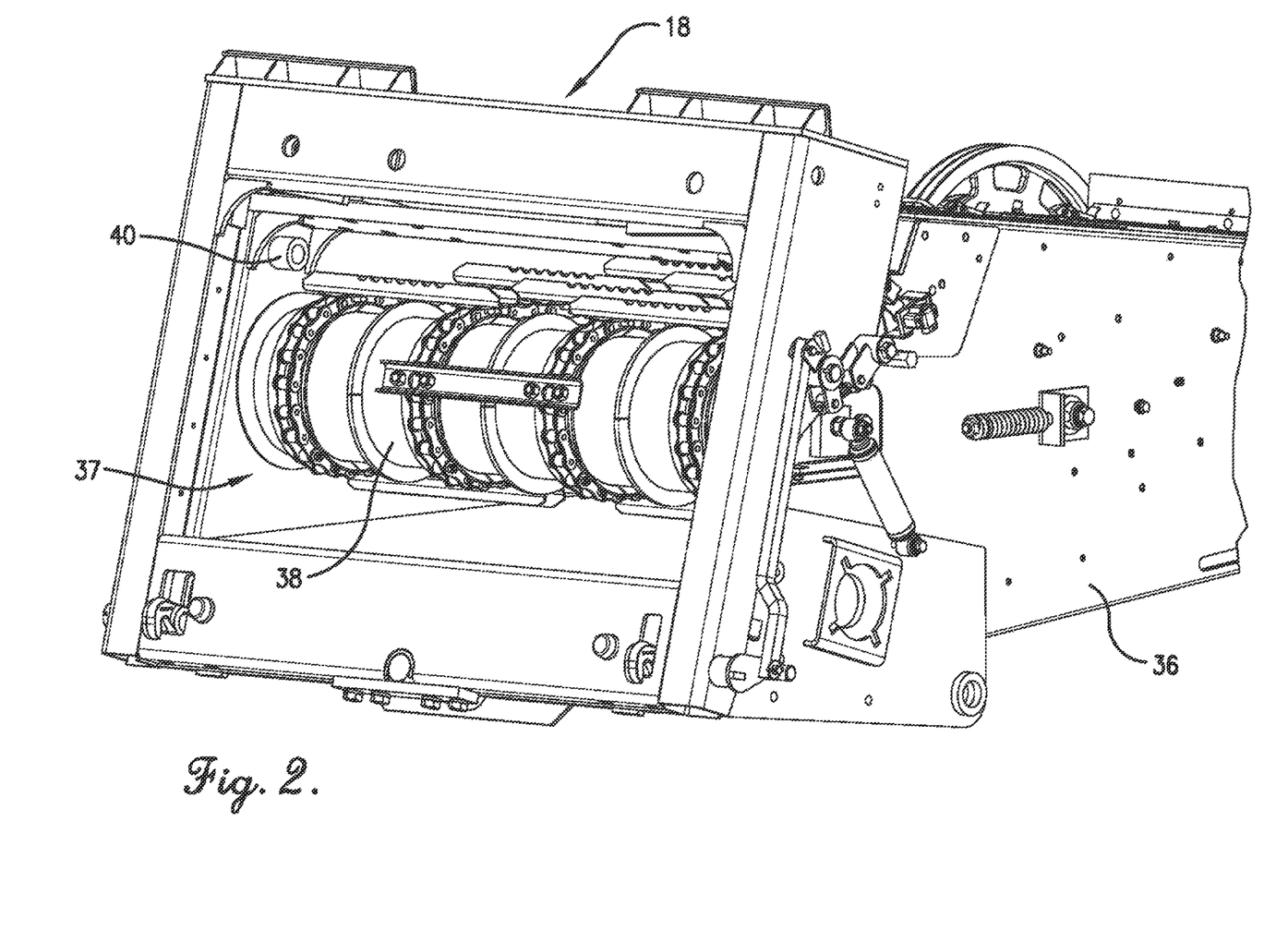
FIG. 2 is a perspective view of a feeder box of the combine harvester shown in FIG. 1 and including an organic material throughput sensor according to aspects of the invention.

More particularly, the crop gathering header 20 includes various cutting and transporting mechanisms used to sever the organic material from a field and direct the organic material towards the feeder house 18. For example, in the depicted embodiment the crop gathering header 20 includes a reel 22 and auger 24. As the combine harvester 10 moves forward (via operation of the front drive wheels or tracks 14), the reel 22 rotates and severs the crop being harvested from the field. The spinning auger 24 then transports the cut organic material towards a center of the combine harvester 10, and more particularly towards an opening 25 in the rear wall of the crop gathering header 20 that is aligned with an open inlet 37 of the outer casing 36 of the feeder house 18 (FIG. 2). The feeder house 18 in turn conveys the organic material into an interior of the main body 12 via an elevator 38. More particularly, the rotating elevator 38 engages the cut organic material and transports it generally upwards and backwards, towards an open outlet of the outer casing 36 of the feeder house 18.

Once inside the main body 12, the cut organic material is first fed to a threshing mechanism 26. At a high level, the threshing mechanism 26 includes various cylinders, concaves, separators, pans, sieves, cleaners, and other mechanisms for separating grain or other harvested crop from the straw, chaff, and other byproducts of the cut organic material. The separated grain or harvested crop is then carried via an elevator or the like to a grain tank 28 in the main body 12, while the straw, chaff, and other byproducts are exhausted from a back end of the combine harvester 10 to be later baled or otherwise removed from the field, or else stored in a straw tank 30 for later removal. Once the grain tank 28 is at or near capacity, the grain is unloaded into a trailer or cart via the unloading tube 32.

In some embodiments, the combine harvester 10 may include a yield sensor 27 to monitor the yield of the crop being harvested. The yield sensor 27 may be, for example, an optical or weight sensor that measures the amount of grain or the like being transported to the grain tank 28 as the combine harvester 10 operates. This yield data can then be relayed in real-time to an operator within the operator's cab 34 so that the operator knows when the grain tank 28 needs to be emptied. Or the yield data may be stored via an on-board memory for later uploading to a data management system such as a Farm Management Information System (FMIS) or other suitable program, or else transmitted wirelessly by a wireless communication system on the combine harvester to the data management or similar system.

Figure 3:
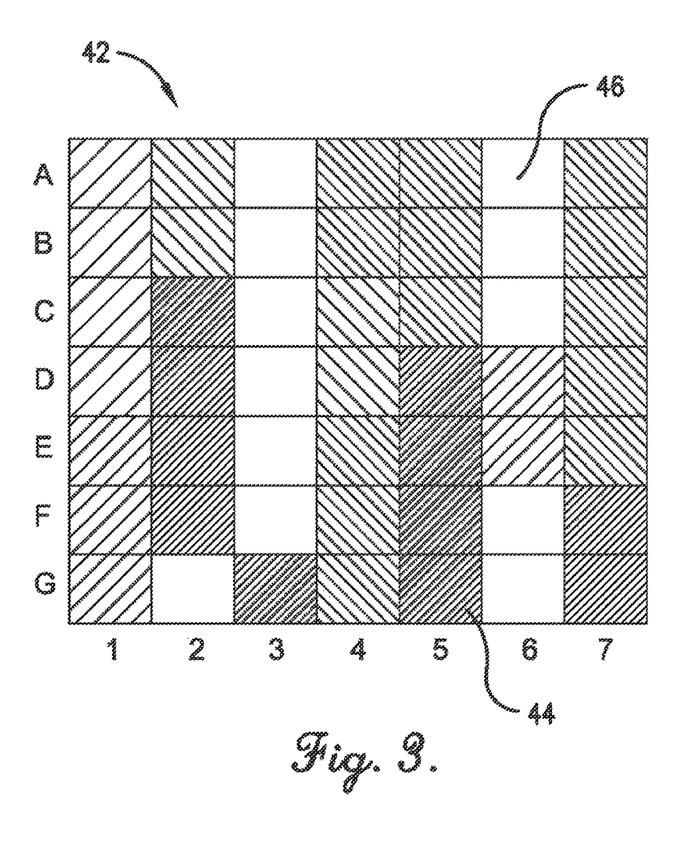
FIG. 3 is a yield map compiled using data sensed by a yield sensor of the combine harvester shown in FIG. 1.

The data management or similar system in turn is configured to output the data in tabular format, in a map format, or in another desired format for an end-user to review and make planting or treatment decisions in light of the same. For example, FIG. 3 depicts a yield map 42 graphically depicting the yield from a plurality of zones of a harvested field as one example of a yield map that may be generated by the data management or similar system. In the depicted embodiment, the yield map 42 uses different density cross-hatching to graphically represent the yield harvested. Thus, in some embodiments zones without cross-hatching or with relatively little cross hatching, such as zone 46 located at A-6 of the yield map 42's grid, yielded a relatively low amount of crop, while zones with relatively dense cross-hatching, such as zone 44 located at G-5 of the yield map 42's grid, yielded a relatively large amount of crop. Farm operators can in turn use the yield map or similar data to make appropriate decisions regarding fertilizer application, soil conditioning, and other decisions to ensure a more productive crop in future plantings.

In addition to or instead of the yield sensor 27, embodiments of the invention include an organic material throughput sensor 40 that senses a total throughput of organic material passing through the combine harvester 10. Unlike the yield sensor 27, which only measures a mass, weight, volume, or other metric of the grain or harvested crop, the organic material throughput sensor 40 measures a mass, weight, volume, or other metric of the total organic material cut and removed from the field being harvested. This data can then be used in addition to, or in some instances in combination with, the yield sensor 27 data to make more informed decisions about fertilization, soil conditioning, and others as will be described in more detail below. As with the yield data, in some embodiments the organic material throughput data can be provided to an operator in real-time such as via a user interface within the cab 34 of the combine harvester 10.

As shown in FIG. 2, in some embodiments the organic material throughput sensor 40 is provided in the feeder house 18 of the combine harvester 10. The organic material throughput sensor 40 can be any desired type of sensor capable of detecting a volume, mass, weight, or other desired metric of the organic material passing through the feeder house 18. For example, in some embodiments the organic material throughput sensor 40 may be an optical sensor that visually detects a volume of the organic material passing thereby. In other embodiments, the organic material throughput sensor 40 may be a weight sensor operatively coupled to the feeder house 18 elevator 38 that detects a weight of the material being transported by the elevator 38. Other types of sensors can be implemented without departing from the scope of the invention.

Figure 4:
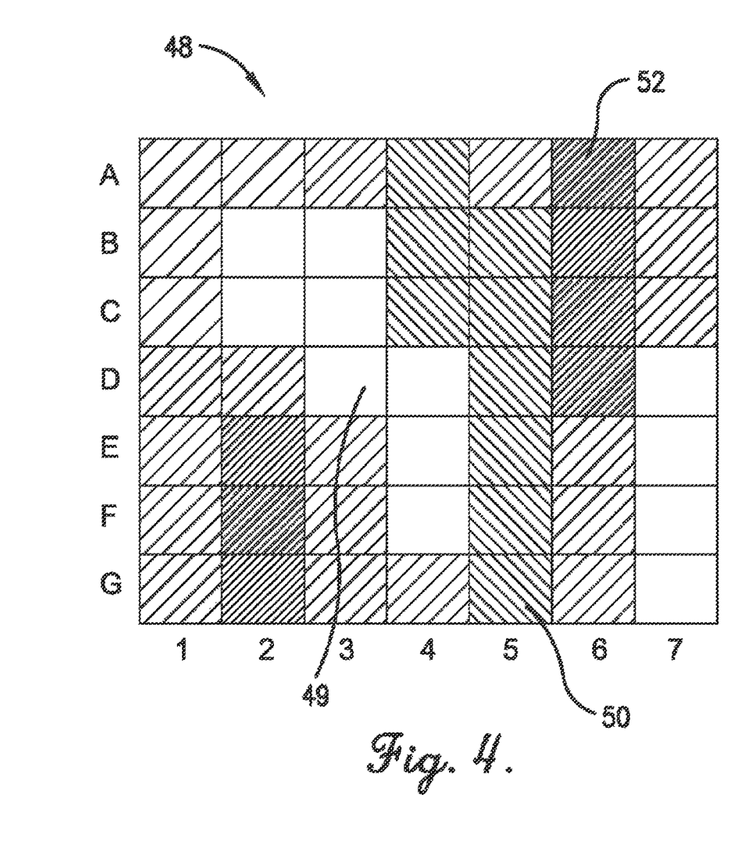
FIG. 4 is an organic material throughput map compiled using data sensed by an organic material throughput sensor of the combine harvester shown in FIG. 1.

As with the data from the yield sensor 27, the data logged by the organic material throughput sensor 40 can be provided to an operator in real time, can be stored on-board via a memory device or the like, and/or can be transmitted or uploaded to a data management system (e.g., FMIS software package or other program) for analysis. In some embodiments, using the organic material throughput data that data management system generates an organic material throughput map 48 such as that shown in FIG. 4. More particularly, FIG. 4 depicts an organic material throughput map 48 that graphically depicts the total organic material removed from a plurality of zones of a harvested field as one example of an organic material throughput map that may be generated by the data management system. In the depicted embodiment, the organic material throughput map 48 cross-hatches different zones according to the amount of organic material removed from the field at the corresponding location. Thus, in some embodiments, in white zones or zones with relatively low amounts of cross-hatching, such as zone 49 located at D-3 of the map 48's grid, a relatively low amount of organic material was removed from the field, while in zones including relatively dense cross hatching, such as zone 52 located at A-6 of the map 48's grid, a relatively large amount of organic material was removed from the field.

The data provided by the organic material throughput map 48 provides producers and other growers with a more complete view of the health of a given field or crop, which in turn aids the producer in making future fertilization, soil conditioning, and other decisions. More particularly, by having access to the organic material throughput map 48 in addition to the yield map 42, the producer has more complete agronomic data showing the health of a field or the condition of the soil. This is particularly useful because there is not always a correlation between yield and total crop mass, as both crop mass and yield may vary throughout the field, independent of each other. Capturing the total crop material throughput provides an additional data set for use by the producer to make future decisions.

Figure 5:
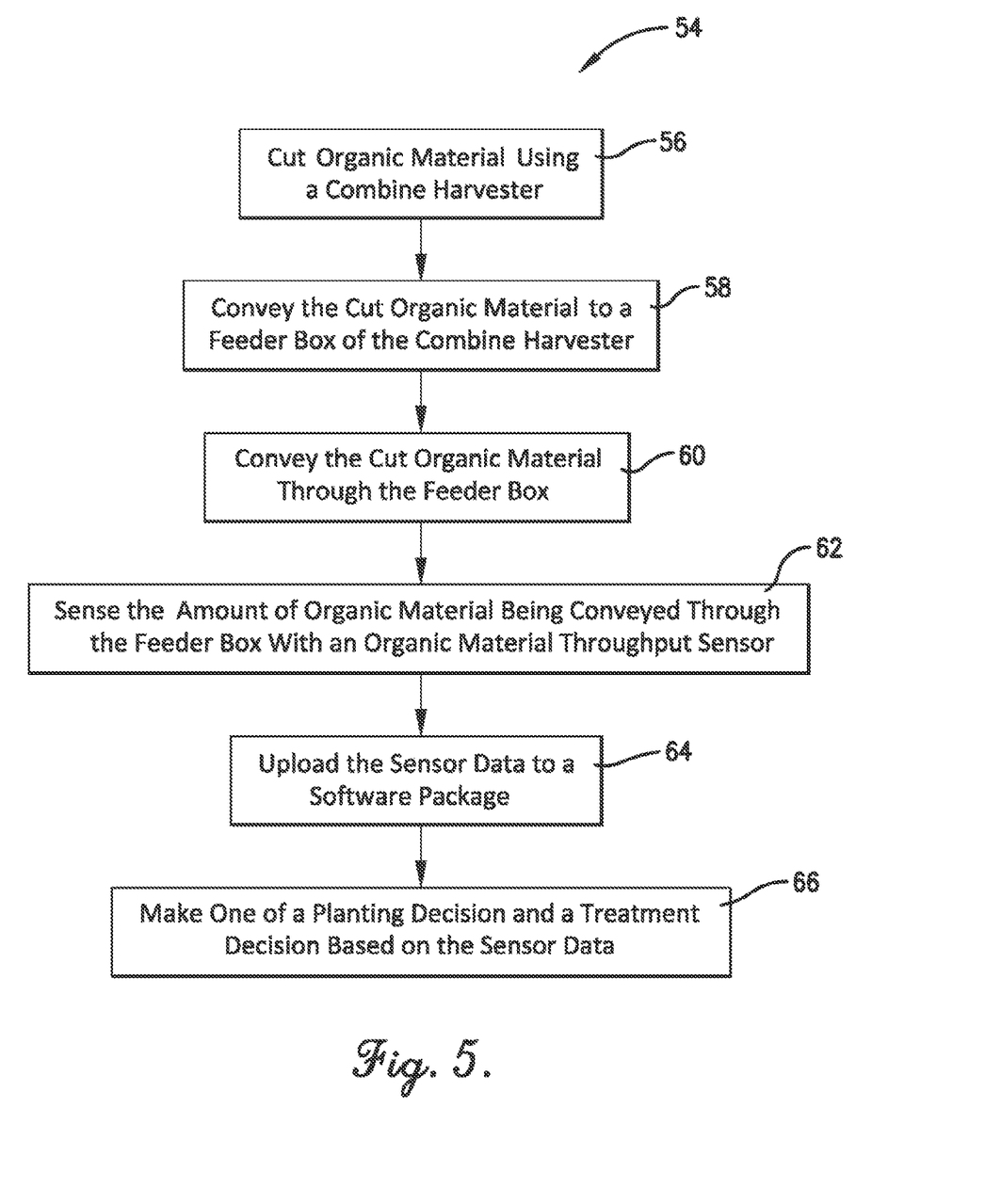
FIG. 5 is a flowchart schematically representing a method of making a planting or treatment decision using organic material throughput data sensed by the organic material throughput sensor of the combine harvester shown in FIG. 1.

For example, FIGS. 5-8 are flowcharts schematically representing methods of using crop data such as data logged by the organic material throughput sensor 40 according to some embodiments of the invention. First, FIG. 5 is a flowchart schematically representing a method 54 of making a planting decision or a treatment decision based on the organic material throughput data. For example, in some embodiments a producer may wish to apply an amount of fertilizer to a field proportional to the amount of total organic material removed from the field. Thus, by using (at least in part) logged data regarding the total organic material throughput removed from a field during harvest, a producer can make an informed decision regarding how much fertilizer to thereafter add to a field.

Turning to the method 54, at step 56 a producer or other operator cuts a crop in a field using a combine harvester, such as the combine harvester 10 described in connection with FIG. 1. At step 58, the cut crop is conveyed to a central portion of the crop gathering header 20, proximate an opening 25 in the rear wall of the crop gathering header 20. At step 60, the cut crop is then conveyed through the feeder box 18, and more particularly through an open inlet 37 of the outer casing of the feeder box 18, through an interior of the feeder box 18, and then through an open outlet of the outer casing 36 for later conveying through various stages of the combine harvester 10 including a threshing mechanism 26.

At step 62, while the organic material is being conveyed through the feeder box 18 and prior to being passed through the threshing mechanism 26, the organic material throughput is sensed using any desired sensor such as an optical, weight, or mass sensor 40. The data from the sensor is stored in any desired format via on on-board memory device or the like or else is transmitted wirelessly for storage at a remote location such as a centralized server, personal computer, or similar device having a suitable memory device. At step 64, the data from the sensor is uploaded into a data management system such as a FMIS software package or the like for review by a producer. In some embodiments the software package may output the data graphically in the form of an organic mass throughput map such as the map 48 discussed in connection with FIG. 4.

At step 66 the producer makes at least one of a planting and treatment decision based on its review of the data. In some embodiments, the planting and/or treatment decision may be one of which type of crop and/or varietal to plant, or may be what type and/or quantity of fertilizer to apply to the field. For example, the producer may determine how much total fertilizer should be applied the harvested field based on the total amount of organic material removed from the filed during the harvesting. Or the producer may determine where to selectively apply fertilizer in the field according to the data. As one example, a producer may desire to apply more fertilizer in areas of the field where the most organic material was removed during harvesting. In such embodiments, at step 66 the producer may thus decide to apply more fertilizer to areas where there was a relatively large volume of organic material removed—such as zone 52 in the organic mass throughput map 48—and apply less fertilizer to areas where there was a relatively low volume of organic material removed—such as zone 49 in the organic mass throughput map 48.

Figure 6:
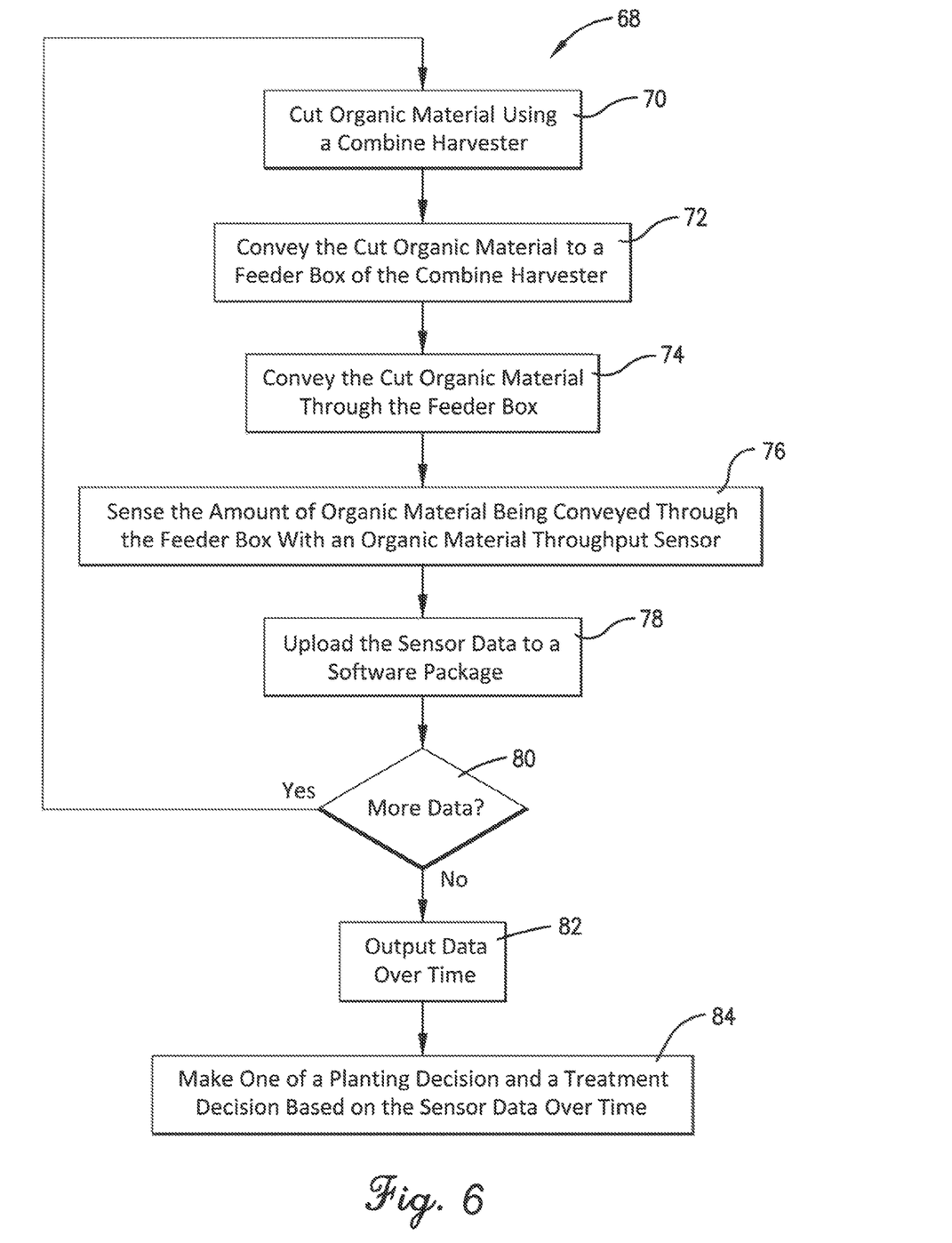
FIG. 6 is a flowchart schematically representing a method of making a planting or treatment decision using organic material throughput data sensed over time by the organic material throughput sensor of the combine harvester shown in FIG. 1.

In some embodiments, the producer may make a planting, treatment, or other decision based on material throughput data over time. This may replace or else augment the need to take soil samples of a field, which are traditionally used to make fertilizer and other treatment decisions. More particularly, FIG. 6 is a flowchart schematically representing a method 68 of determining how much or what type of fertilizer to apply to a field using material throughput data over time. At steps 70, 72, 74, 76, and 78 of method 68, a producer cuts a crop, conveys it to and through a feeder box of a combine harvester, senses the organic material throughput with a sensor in the feeder box, and uploads the sensor data to a software package or the like in a similar manner as described about with respect to steps 56, 58, 60, 62, and 64 of method 54, which thus will not be repeated in detail.

In order to view material throughput data of a particular field or the like over time, steps 70, 72, 74, 76, and 78 are repeated such that the producer has data for two or more successive harvests. Namely, at step 80, when more data is to be collected for a time lapse comparison, steps 70, 72, 74, 76, and 78 are repeated for a successive harvest. Once enough data has been collected for a time-lapse comparison—i.e., once data has been collected for two or more harvests—the method proceeds to step 82, where a data management system generates material throughput maps or other time-lapse data detailing the organic material throughput over time.

At step 84 a producer makes a planting or treatment decision based on the data outputted at step 82. For example, in some embodiments the producer determines an amount or type of fertilizer to apply to a field based on the data outputted at step 82. In such embodiments, the producer may decide to apply a first type and/or amount of fertilizer if the data shows a steadily decreasing material throughput from a particular field over time. Or the producer may decide to apply a second type and/or amount of fertilizer if the data shows a steadily increasing material throughput from a particular field over time. Still more, the producer may decide to apply a third type and/or amount of fertilizer if the data shows a relatively steady material throughput from a particular field over time. By utilizing the time lapse data in such a fashion, the producer may be able to replace, or else augment, soil sampling traditionally carried out to make such fertilization decisions.

Figure 7:
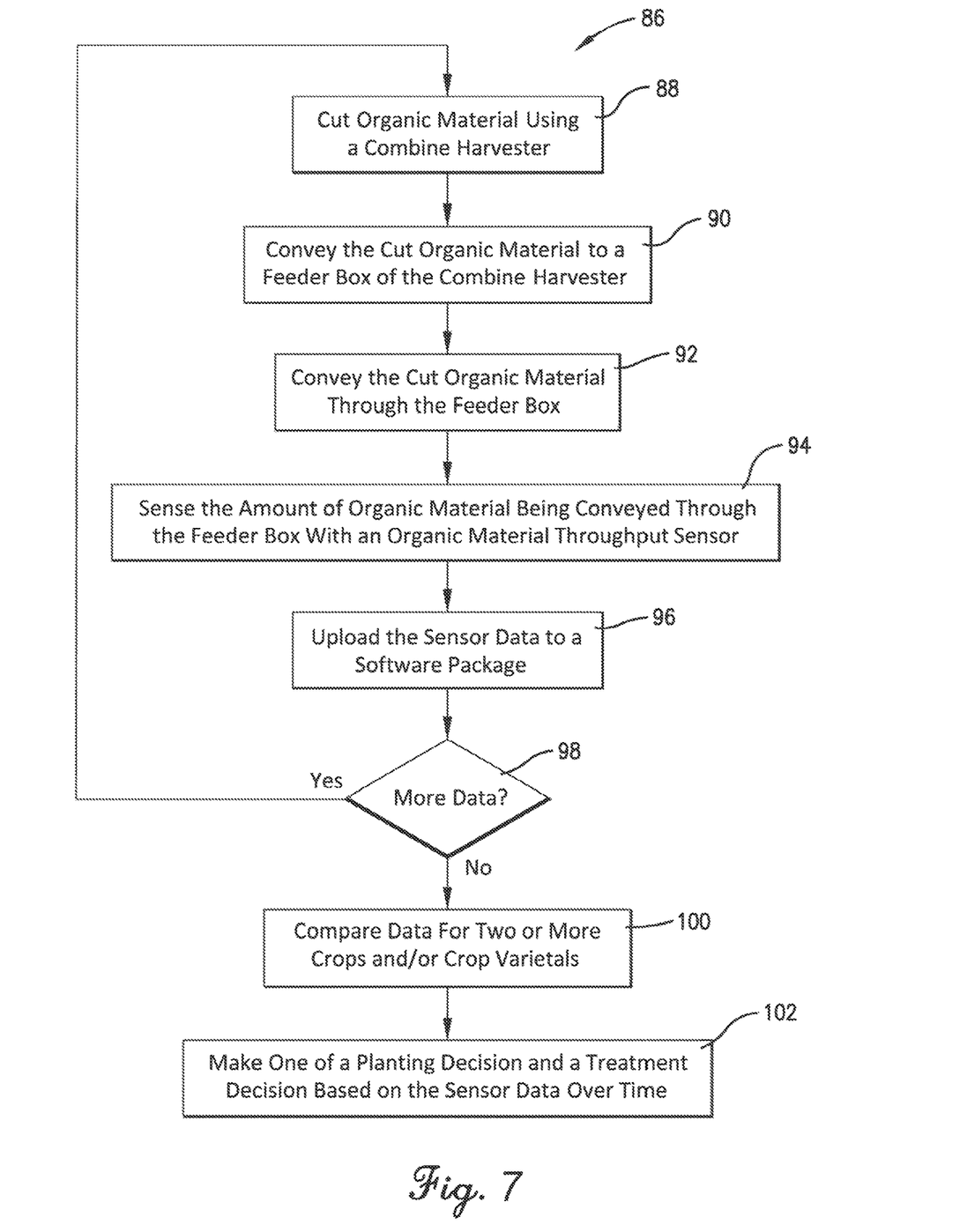
FIG. 7 is a flowchart schematically representing a method of making a planting or treatment decision using organic material throughput data for two or more crops or crop varietals sensed by the organic material throughput sensor of the combine harvester shown in FIG. 1.

In some embodiments, the producer may make a planting decision based on a comparison of material throughput data for a plurality of crops and/or varietals of crops. More particularly, FIG. 7 is a flowchart schematically representing a method 86 of determining which crop or crop varietal using organic material throughput data. At steps 88, 90, 92, 94, and 96 of method 86, a producer cuts a crop, conveys it to and through a feeder box of a combine harvester, senses the organic material throughput with a sensor in the feeder box, and uploads the sensor data to a data management system such as FMIS software or the like in a similar manner as described about with respect to steps 56, 58, 60, 62, and 64 of method 54, which thus will not be described again in detail.

In order to compare material throughput data for two or more crops or crop varietals, steps 88, 90, 92, 94, and 96 of method 86 are repeated such that the producer has data for two or more crops and/or crop varietals. Namely, at step 98, when more data is to be collected for crop or varietal comparison, steps 88, 90, 92, 94, and 96 are repeated for a different crop and/or crop varietal. For example, data may be collected for a different field in which a different crop or crop varietal was planted, or data may be collected in a successive harvest for the same field but for which a different crop or crop varietal was planted.

Once enough data has been collected for a crop or crop varietal comparison—i.e., once data has been collected for two or more crops or crop varietals—the method proceeds to step 100, where the data management system generates material throughput maps or other graphical output detailing the data collected from the material throughput sensor. For example, in some embodiments at least two different organic material throughput maps—similar to the map 48 shown in FIG. 4—are generated, one for each crop and/or crop varietal being compared. The producer or other user is then able to quickly visualize and compare the performance of each crop and/or crop varietal. For example, in some embodiments a first set of data is collected for a first wheat hybrid and a second set of data is collected for a second wheat hybrid. In such embodiments, a producer may compare, among other data, the organic material throughput map for the first wheat hybrid with the organic material throughput map for the second wheat hybrid. This data may provide the producer a more useful side-by-side comparison of crop hybrids than known comparisons. More particularly, instead of just comparing yield, this data enables producers to compare total plant mass for each varietal.

Figure 8:
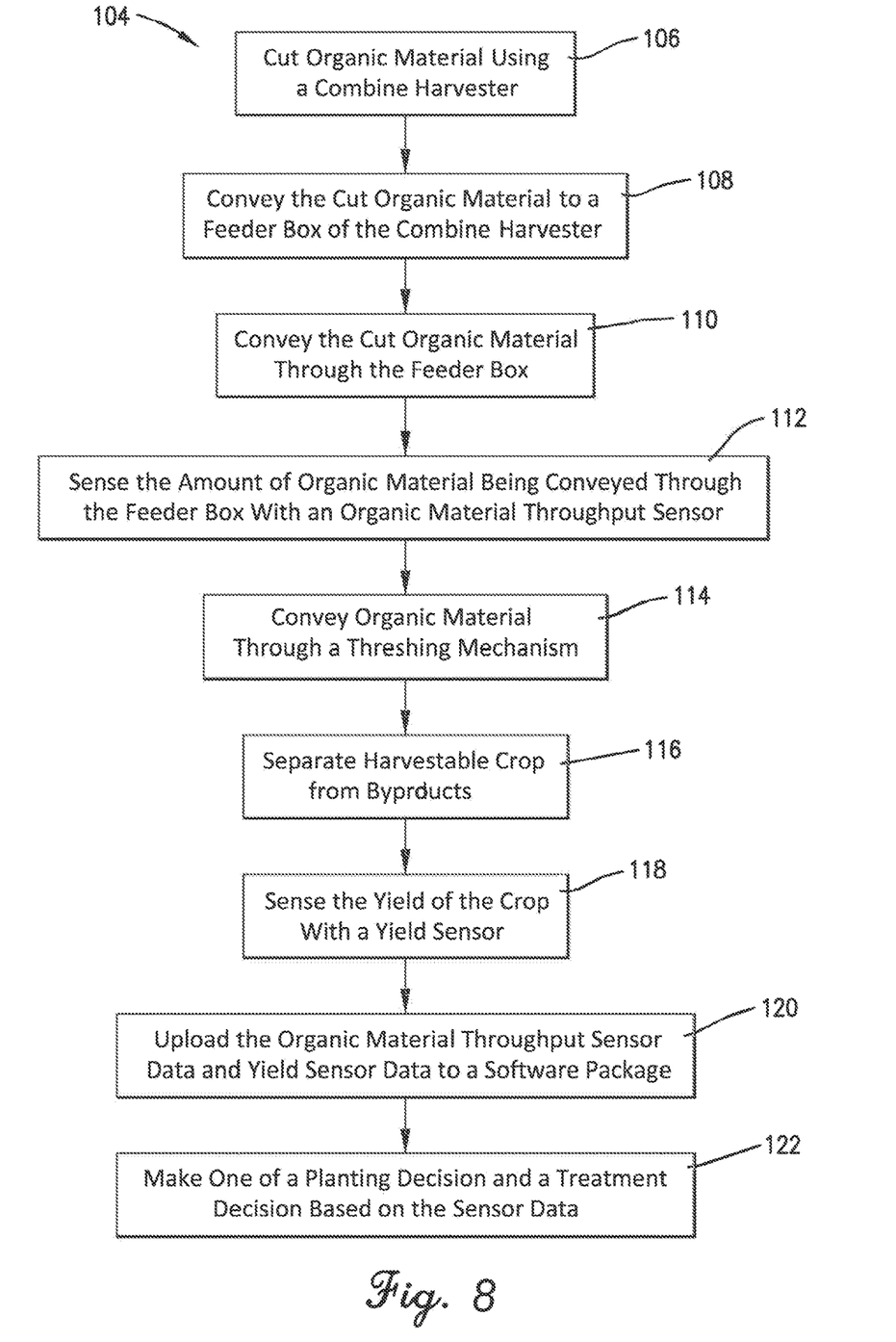
FIG. 8 is a flowchart schematically representing a method of making a planting or treatment decision using organic material throughput data and yield data sensed by the organic material throughput sensor and yield sensor, respectively, of the combine harvester shown in FIG. 1.

In still other embodiments, the producer may make a crop planting and/or treatment decision based on both sensed yield and total organic material throughput. This may be more readily understood with reference to FIG. 8. More particularly, FIG. 8 is a flowchart schematically representing a method 104 of making a planting or treatment decision based on at least two different metrics for a single crop; in this case, total organic material and crop yield. At steps 106, 108, 110, and 112 of method 104, a producer cuts a crop, conveys it to and through a feeder box of a combine harvester, and senses the organic material throughput with a sensor in the feeder box in a similar manner as described above with respect to steps 56, 58, 60, and 62 of method 54, which thus will not be described again in detail. At step 114, the cut material is then conveyed through a threshing and/or cleaning mechanism, such as the threshing mechanism 26 described in connection with the combine harvester 10. Again, the threshing and/or cleaning mechanism separates the harvested crop (e.g., grain) from the byproducts (e.g., straw, chaff, etc.). At step 118, a yield sensor such as yield sensor 27 discussed above in connection with combine harvester 10 senses the yield of the harvested crop.

At step 120, the data from the organic material throughput sensor and yield sensor is uploaded to the data management system such as the FMIS software discussed above. And finally, at step 122, a producer or the like makes one of a planting and/or a treatment decision based at least in part on data from the organic material throughput sensor and the yield sensor. For example, in some embodiments the data management system may output the yield data and the organic material throughput data in the form of a yield map (similar to that shown in FIG. 3) and an organic material throughput map (similar to that shown in FIG. 4). In turn, the producer makes one of a planting decision and a treatment decision based at least in part on the yield map and the organic material throughput map. For example, if the comparison reveals that the total organic material cut for a certain field is relatively high, but the overall yield is relatively low, the producer may thereafter plant a different crop varietal and/or apply a different amount or type of fertilizer in an effort to improve yield in subsequent harvests. In short, the two sets of data provide a more complete set of data to the producer in order to make more informed planting and/or treatment decisions.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Additional objects, advantages, and novel features of the invention will be apparent to those skilled in the art upon examination of the above or may be learned by practice of the invention.

What is claimed is:

1. A method of monitoring a throughput of a crop, the method comprising:
    cutting organic material using a combine harvester;
    conveying the organic material through the combine harvester to a threshing mechanism located within a main body of the combine harvester;
    sensing, prior to the organic material being conveyed through the threshing mechanism and using an organic material throughput sensor, organic material throughput data, wherein the organic material throughput data comprises at least one of: a volume of the organic material, and a weight of the organic material;
    transmitting the organic material throughput data to a data management system; and
    outputting, by the data management system, an organic material throughput map based on the organic material throughput data.

2. The method of claim 1 further comprising determining, based on the organic material throughput data, at least one of: a type of crop to plant in a field, and an amount of seed to plant in the field.

3. The method of claim 1 further comprising determining, based on the organic material throughput data, at least one of: a type of fertilizer to apply to a field, and an amount of fertilizer to apply to the field.

4. The method of claim 1, wherein the combine harvester includes a feeder box configured to convey the organic material from a header of the combine harvester to the main body of the combine harvester, and wherein the organic material throughput sensor is provided in the feeder box.

5. The method of claim 1 further comprising:
    separating, via the threshing mechanism, a harvestable crop from byproducts of the organic material;
    sensing, using a yield sensor within the combine harvester, yield data, wherein the yield data comprises at least one of: a volume of the harvestable crop, and a weight of the harvestable crop;
    transmitting the yield data to the data management system; and
    outputting, by the data management system, a yield map based on the yield data.

6. The method of claim 5 further comprising determining, based on a comparison of the organic material throughput data and the yield data, at least one of: a type of crop to plant in a field, and an amount of seed to plant in the field.

7. The method of claim 5 further comprising determining, based on a comparison of the organic material throughput data and the yield data, at least one of: a type of fertilizer to apply to a field, and an amount of fertilizer to apply to the field.

* * * * *